(12) United States Patent
Shimizu

(10) Patent No.: US 10,697,765 B2
(45) Date of Patent: Jun. 30, 2020

(54) IMAGE PROCESSING APPARATUS, IMAGE PROCESSING SYSTEM, AND PROGRAM THEREFOR

(71) Applicant: OMRON Corporation, Kyoto-shi, Kyoto (JP)

(72) Inventor: Takashi Shimizu, Hikone (JP)

(73) Assignee: OMRON Corporation, Kyoto-shi (JP)

(*) Notice: Subject to any disclaimer, the term of this patent is extended or adjusted under 35 U.S.C. 154(b) by 0 days.

(21) Appl. No.: 16/161,552

(22) Filed: Oct. 16, 2018

(65) Prior Publication Data

US 2019/0195622 A1    Jun. 27, 2019

(30) Foreign Application Priority Data

Dec. 27, 2017   (JP) ................. 2017-251306

(51) Int. Cl.
| | |
|---|---|
| G01B 11/25 | (2006.01) |
| G06F 17/12 | (2006.01) |
| G01B 11/14 | (2006.01) |
| G01B 11/00 | (2006.01) |
| G06T 7/521 | (2017.01) |

(52) U.S. Cl.
CPC ........ G01B 11/2513 (2013.01); G01B 11/002 (2013.01); G01B 11/14 (2013.01); G06F 17/12 (2013.01); G06T 7/521 (2017.01)

(58) Field of Classification Search
CPC ... G01B 11/002; G01B 11/14; G01B 11/2513; G06F 17/12; G06T 7/521

USPC .................................. 356/600–640
See application file for complete search history.

(56) References Cited

U.S. PATENT DOCUMENTS

2008/0024502 A1   1/2008  Nagahara et al.
2013/0258060 A1   10/2013 Kotake

FOREIGN PATENT DOCUMENTS

JP        2009-511897 A    3/2009

OTHER PUBLICATIONS

Extended European search report dated Mar. 21, 2019 in a counterpart European patent application.

*Primary Examiner* — Tri T Ton
(74) *Attorney, Agent, or Firm* — Metrolex IP Law Group, PLLC

(57) ABSTRACT

An image processing system comprises: a projector for projecting pattern light whose coordinate component at least in one direction is determinable; an imaging apparatus for imaging an object illuminated with the pattern light to acquire a pattern image; and a controller including a calculator for calculating the 3D coordinates of a point on the object based on the pattern light and the pattern image. The calculator determines a first point on the pattern image; calculates a second point corresponding to the first point in a pattern-light projection plane; calculates a third point based on the second point in the projection plane, a nonlinear line in the projection plane calculated by analyzing the pattern image, and an epipolar line in the projection plane calculated based on the first point; and calculates the three-dimensional coordinates of the point on the object based on the first point and the third point.

18 Claims, 12 Drawing Sheets

IMAGE PROCESSING APPARATUS, IMAGE PROCESSING SYSTEM, AND PROGRAM THEREFOR

CROSS-REFERENCES TO RELATED APPLICATIONS

This application claims priority to Japanese Patent Application No. 2017-251306 filed Dec. 27, 2017, the entire contents of which are incorporated herein by reference.

FIELD

The disclosure relates to an image processing apparatus, an image processing system, and a program therefor.

BACKGROUND

Recently, systems have been devised for projecting coded pattern light to an object and analyzing the image captured when the light is projected so as to generate a three-dimensional map of that object (see JP 2009-511897A and US 2008-024502A). Such a system performs three-dimensional measurement by determining the correspondence of pixels between the projected pattern light and the pattern image formed by a camera.

JP 2009-511897A and US 2008-024502A are examples of background art.

SUMMARY

Problem to be Solved by the Invention

In actual operation, however, as the lens of a projector for projecting pattern light is subject to distortion, the projected pattern is also distorted. As a result, if a three-dimensional measurement is performed using conventional technology, such as the two technologies described above, an object may not be three-dimensionally reconstructed with sufficiently high precision due to the effect of the lens distortion.

One or more aspects have been developed in view the foregoing circumstances, and one or more aspects may generate information about a three-dimensional point group of an object with higher precision by suitably correcting the effect of the lens distortion of a projector.

Means to Solve the Problem

One or more aspects employ the configurations below in order to solve the above-described problem.

An image processing system according to one aspect comprises: a light projection apparatus for projecting pattern light whose coordinate component at least in one direction is determinable; an imaging apparatus for imaging an object to which the pattern light is projected to acquire a pattern image; a control apparatus including a calculation unit configured to calculate the three-dimensional coordinates of at least one point on the object based on the pattern light and the pattern image; wherein calculation unit includes: the a determination unit configured to determine a first point on the pattern image; a calculation unit configured to calculate a second point in a projection plane of the pattern light based on a pattern imaged on the location of the first point, the second point corresponding to the first point; a correction unit configured to calculate a third point based on the second point in the projection plane, a nonlinear line in the projection plane calculated by analyzing the pattern image, and an epipolar line in the projection plane calculated based on the first point; and a calculation unit configured to calculate the three-dimensional coordinates of the point on the object based on the first point and the third point. According to the foregoing configuration, the effect of the lens distortion of the light projection apparatus can be properly corrected.

The foregoing correction unit may further include: a setting unit configured to set the second point as an initial value point A; a calculation unit configured to calculate a point B by performing a first operation relating to coordinate transformation on the point A; a calculation unit configured to calculate a point C by performing a second operation based on the nonlinear line on the point B; a calculation unit configured to calculate a point D by performing a third operation relating to coordinate transformation on the point C; and a calculation unit configured to calculate a point E by performing a fourth operation based on the epipolar line on the point D.

Moreover, the correction unit may further include a determination unit configured to determine whether or not a predetermined termination condition is satisfied after the fourth operation is executed, and wherein, if it is determined that the termination condition is satisfied, the determination unit may set the point E as the third point and, if it is determined that the termination condition is not satisfied, set the point E as the initial value point A and repeat the first to fourth operations. Furthermore, the termination condition may be that the coordinates of the point A and the point E are within a predetermined range. Additionally, the termination condition may be the number of times the first to fourth operations have been repeated. In the foregoing configuration, by terminating the operations when the termination condition is determined to be satisfied, it is possible to reduce the use of unnecessary operating resources and speed up the operation.

In addition, a control apparatus according to one aspect is connected to: a light projection apparatus for projecting pattern light whose coordinate component at least in one direction is determinable and an imaging apparatus for imaging an object to which the pattern light is projected to acquire a pattern image; the control apparatus comprising a calculation unit configured to calculate the three-dimensional coordinates of at least one point on the object based on the pattern light and the pattern image; wherein calculation unit includes: the a determination unit configured to determine a first point on the pattern image; a calculation unit configured to calculate a second point in a projection plane of the pattern light based on a pattern imaged on the location of the first point, the second point corresponding to the first point; a correction unit configured to calculate a third point based on the second point in the projection plane, a nonlinear line in the projection plane calculated by analyzing the pattern image, and an epipolar line in the projection plane calculated based on the first point; and a calculation unit configured to calculate the three-dimensional coordinates of the point on the object based on the first point and the third point.

Furthermore, a method according to one aspect is performed by a control apparatus connected to a light projection apparatus for projecting pattern light whose coordinate component at least in one direction is determinable and an imaging apparatus for imaging an object to which the pattern light is projected to acquire a pattern image, the method calculating the three-dimensional coordinates of at least one point on the object based on the pattern light and the pattern image: wherein the control apparatus is configured to: determine a first point on the pattern image; calculate a second point in a projection plane of the pattern light based on a pattern imaged on the location of the first point, the second point corresponding to the first point; calculate a third point based on the second point in the projection plane, a nonlinear line in the projection plane calculated by analyzing the pattern image, and an epipolar line in the projection plane calculated based on the first point; and calculate the three-dimensional coordinates of the point on the object based on the first point and the third point.

Furthermore, a program according to one aspect is for use in a control apparatus connected to a light projection apparatus for projecting pattern light whose coordinate component at least in one direction is determinable and an imaging apparatus for imaging an object to which the pattern light is projected to acquire a pattern image, the program causing the control apparatus to calculate the three-dimensional coordinates of at least one point on the object based on the pattern light and the pattern image and further causing: the control apparatus to function as: a determination unit configured to determine a first point on the pattern image; a calculation unit configured to calculate a second point in a projection plane of the pattern light based on a pattern imaged on the location of the first point, the second point corresponding to the first point; a calculation unit configured to calculate a third point based on the second point in the projection plane, a nonlinear line in the projection plane calculated by analyzing the pattern image, and an epipolar line in the projection plane calculated based on the first point; and a calculation unit configured to calculate the three-dimensional coordinates of the point on the object based on the first point and the third point.

Effect of the Invention

According to one or more aspects, it is possible to generate information about a three-dimensional point group of an object with higher precision by suitably correcting the effect of the lens distortion of a projector.

DETAILED DESCRIPTION

One or more embodiments (also referred to as "an embodiment" hereinafter) will be described hereinafter based on the drawings. It should be noted, however, that an embodiment described below is merely an example of the present invention in every aspect. It goes without saying that various modifications and changes may be made without departing from the scope of the present invention. In other words, to practice the present invention, any specific configuration may be used as appropriate according to an embodiment. Moreover, although the data used in an embodiment is described in natural language, more specifically, it is specified by a pseudo-language, commands, parameters, a machine language or the like.

1. Application Examples

Figure 1:
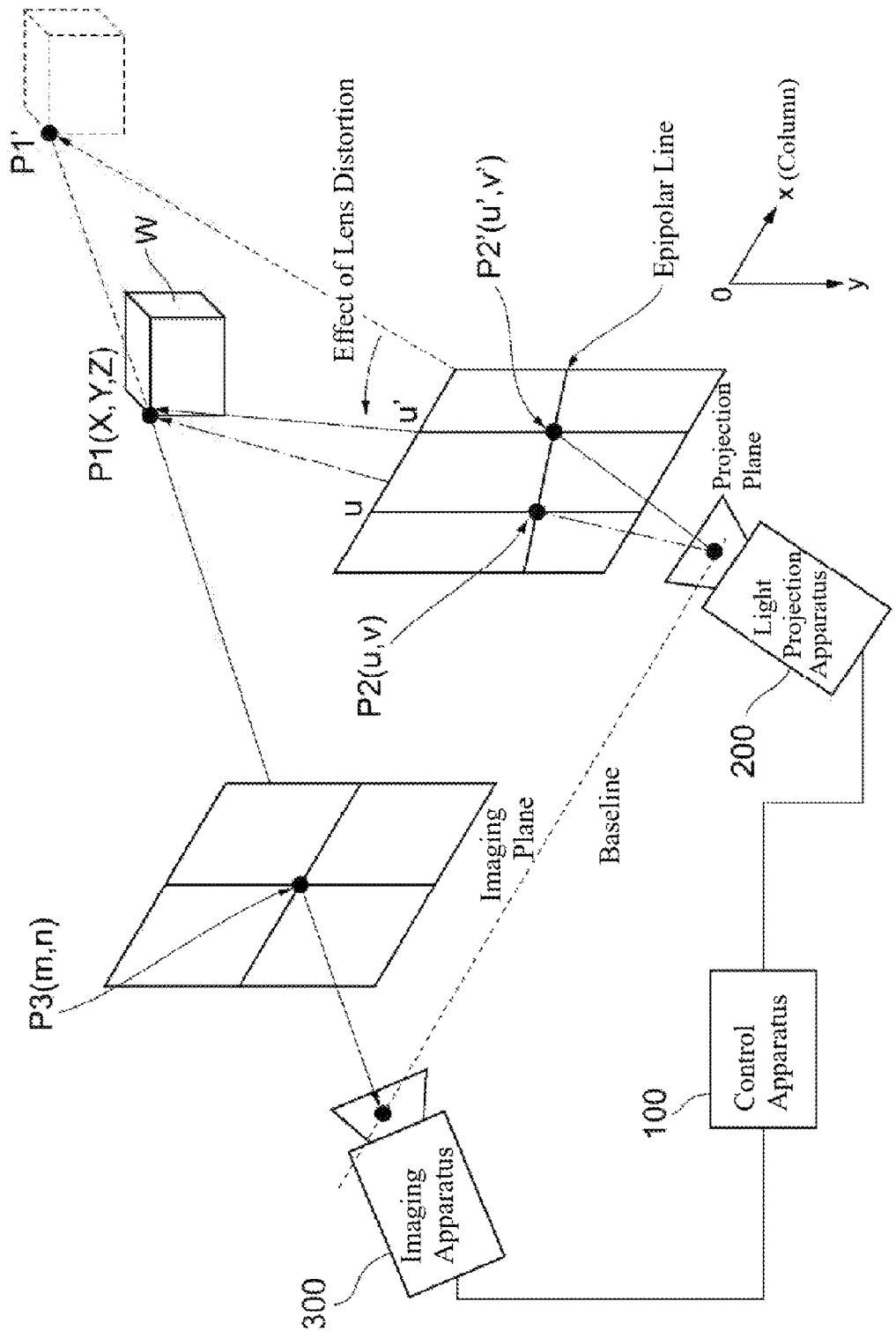
FIG. 1 is a schematic overview illustrating an image processing system according to an embodiment.

First, one exemplary situation to which an embodiment is applied will be described with reference to FIG. 1. FIG. 1 is a schematic view that shows one exemplary situation to which an image processing system 1 according to an embodiment is applied. The image processing system 1 according to an embodiment is comprised of a control apparatus 100, a light projection apparatus 200, and an imaging apparatus 300. It should be noted that the image processing system 1 is one example of an image processing system according to an embodiment. The control apparatus 100 is one example of a control apparatus according to an embodiment. The light projection apparatus 200 is one example of a light projection apparatus according to an embodiment. The imaging apparatus 300 is one example of an imaging apparatus according to an embodiment.

One technique to perform three-dimensional measurement of an object utilizes triangulation as the basic principle to calculate three-dimensional locations by projecting pattern light having a predetermined pattern to an object, imaging the object to which the pattern light is projected, and calculating distances. This technique largely includes two approaches. One is a temporal approach in which a plurality of pattern images for projection are prepared and temporally switched at a high speed during projection, and the other is a spatial approach in which a single spatially coded pattern image is projected. Either approach can be used in an embodiment as long as the approach uses a pattern that can determine the coordinate components of the projected pattern light at least in one direction through analysis of the imaged pattern image so as to estimate the coordinates of corresponding points of the pattern light.

The light projection apparatus 200 used in an embodiment is capable of projecting pattern light having a predetermined spatial pattern to an object. The pattern projected in an embodiment is structured, for example, to allow for the determination of the coordinate components in the column direction (the y-direction). In other words, by analyzing a pattern image that captures the pattern light, it is possible to determine the column of pattern light that corresponds to a predetermined point on the pattern image.

The imaging apparatus 300 images an object W to which pattern light is projected to acquire a pattern image on a predetermined imaging plane. The control apparatus 100 determines the above-described coordinate component in one direction by analyzing the pattern image captured by the imaging apparatus 300 and associates the pattern image captured by the imaging apparatus 300 with the pattern light projected by the light projection apparatus 200. For example, the control apparatus 100 determines a specific point P3 in the pattern image captured by the imaging apparatus 300 at which a point P1 on the object is imaged. The control apparatus 100 analyzes the pattern image to determine the column u' of pattern light that corresponds to the pattern imaged at the location of the point 3. The control apparatus 100 finds the coordinates of the point P2' (u', v') in the projection plane along the pattern light corresponding to the point P3, that is, the coordinates of the point P2' (u', v') in the projection plane in which the pattern light is formed, from the intersection between the column u' and the epipolar line that is determined about the point P3 based on the optical centers of the light projection apparatus 200 and the imaging apparatus 300.

Then, processing is performed to correct the effect of the distortion of the lens of the light projection apparatus 200. Specifically, the control apparatus 100 finds the coordinates of the point P2 (u, v) on the pattern light projected to the point P1 on the object if the effect of the lens distortion does not exist (indicated by the alternate long and short dashed line in FIG. 1), that is, the coordinates of the point P2 (u, v) in the projection plane in which the pattern light is formed. Subsequently, the three-dimensional coordinates (X, Y, Z) of the point P1 for which the effect of the lens distortion is properly corrected are calculated based on the coordinates of the point P3 (m, n) on the pattern image and the coordinates of the point P2 (u, v) on the pattern light obtained by correction. In FIG. 1, the solid line arrows indicate an exemplary actual optical path along which light travels from the light projection apparatus through the projection plane and is reflected on the object W to be incident on the imaging apparatus via the imaging plane. Without correcting the effect of the lens distortion, the three-dimensional coordinates of the point P1' would be calculated and a measurement error would be produced.

The correction of the effect of the lens distortion, i.e., the processing to find the post-correction point P2 from the pre-correction point P2', can be done by performing specific iterative operations using, as the conditions of constraint, both the non-linear x coordinate, with respect to the point P3, in the projection plane obtained by analyzing the pattern image (also referred to as "distorted x coordinate" hereinafter and, in particular, that related to the point P3 will be referred to as the "distorted x coordinate with respect to the point P3" hereinafter) and the epipolar line of the point P3 in the projection plane (also referred to as "epipolar line with respect to the point P3" hereinafter). Here, the distorted x coordinate with respect to the point P3 is represented by a non-linear line passing through the point P2' in the projection plane, and the coordinate can be found by analyzing the pattern image to determine the points on the pattern light associated with the respective points (m, y) (y is arbitrary) in the column passing through the point P3 on the pattern image (the line represented by x=m in the imaging plane). In other words, the distorted x coordinate on the pattern light is imaged as the column that passes through the point P3 in the pattern image in the actual optical path, and the distorted x coordinate can be determined by analyzing the pattern image.

While detailed description is given below with reference to FIGS. 6A to 6F, the following describes the procedure to perform the iterative operation to correct the lens distortion. First, the coordinates of the point P2' in the projection plane are set as the coordinates of the initial value point P21 of the iterative operation. A first operation is performed on the point P21 to find the point P22. Next, the point P23 is found by applying the constraint condition based on the above-described distorted x coordinate to the point P22. Next, a second operation is performed on the point P23 to find the point P24. Lastly, the point P25 is found based on the epipolar constraint condition. If it is determined that a predetermined termination condition is satisfied after this sequence of operations is completed, this correction processing is terminated. Conversely, if it is determined that the termination condition is not satisfied, the coordinates of the point P25 are set as the new initial value point P21 to repeat the foregoing sequence of operations. As one example of the termination condition, the correction processing may be terminated when the coordinates of the point P21 before and after the sequence of operations and the coordinates of the point P25 converge to within a predetermined range. Alternatively, the correction processing may be terminated when the sequence of operations has been repeated a predetermined number of times.

The three-dimensional coordinates of the point P1 are calculated using the coordinates of the point P25 thus obtained as the coordinates of the post-correction (i.e. corrected) point P2. In this way, the image processing system 1 according to an embodiment can properly correct the effect of the lens distortion of the light projection apparatus 200. The point P3 is an example of a "first point" according to an embodiment. The point P2' is an example of a "second point" according to an embodiment. The point P2 is an example of a "third point" according to an embodiment. The point P1 is an example of a "point on an object" according to an embodiment. The distorted x coordinate is an example of a "nonlinear line" according to an embodiment.

2. Exemplary Configurations 2-1. Functional Configuration of Image Processing System 1

Figure 2:
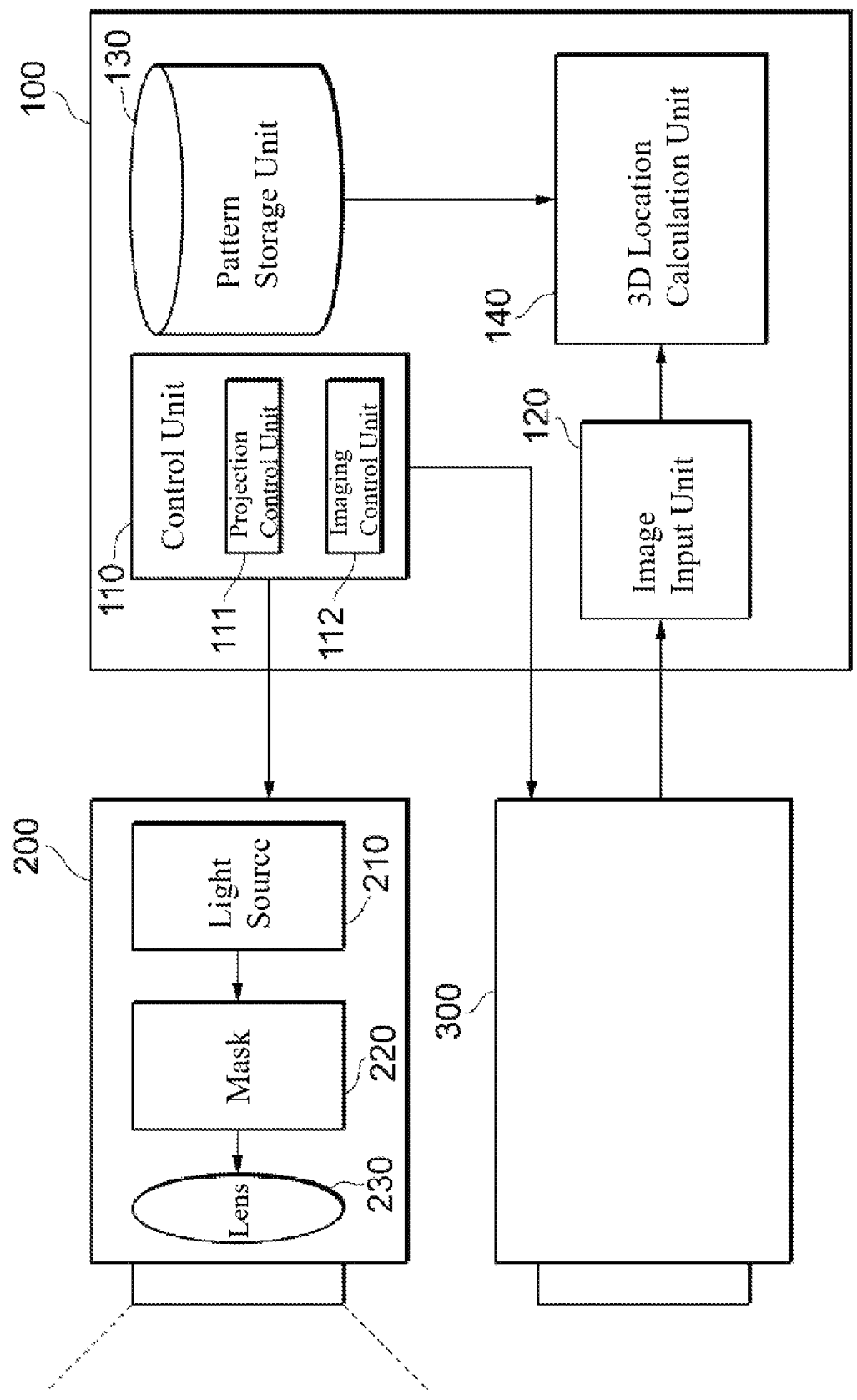
FIG. 2 is a block diagram illustrating one example of the functional configuration of an image processing system according to an embodiment.

FIG. 2 is a block diagram showing one example of the functional configuration of the image processing system 1. The configuration of the image processing system 1 according to an embodiment will be described in detail hereinafter. Referring to FIG. 2, the image processing system 1 is comprised of the control apparatus 100, the light projection apparatus 200, and the imaging apparatus 300 as described above.

(A) Light Projection Apparatus 200

Under the control of the control apparatus 100, the light projection apparatus 200 projects to an object structured pattern light from which the coordinate component of the projected pattern light in at least one direction can be determined by analyzing a captured pattern image. The light projection apparatus 200 can be implemented, for example, by a projector, etc. The light projection apparatus 200 includes a light source 210, a mask 220, and a lens 230.

The light source 210 can be implemented, for example, by an LED (Light Emitting Diode), an LD (Laser Diode), a VCSEL (Vertical Cavity Surface Emitting Laser), or a lamp or the like, and projects a bundle of rays.

The mask 220 has a pattern, so that pattern light is projected to an object as the bundle of rays projected from the light source 210 is transmitted through the mask 220. While the pattern light has a pattern in which the coordinate component in the column direction (the x-axis direction) can be determined in an embodiment, the coordinate component that can be determined is not necessarily limited to this.

The lens 230 expands the bundle of rays that has been transmitted through the mask 220 and projects it to the object.

(B) Imaging Apparatus 300

Under the control of the control apparatus 100, the imaging apparatus 300 images the object to which pattern light is projected to acquire a pattern image. In the description below, an image captured by the imaging apparatus 300 is also referred to as a "captured image". The imaging apparatus 300 can be implemented, for example, by a camera, etc.

(C) Control Unit 100

The control apparatus 100 includes a control unit 110, an image input unit 120, a three-dimensional location calculation unit (an example of a calculation unit) 140, and a pattern storage unit 130.

The control unit 110 includes a projection control unit 111 and an imaging control unit 112. The projection control unit 111 controls the projection of the pattern light by the light projection apparatus 200. In addition, the imaging control unit 112 controls the imaging apparatus 300 to perform imaging at any timing. For example, the imaging control unit 112 controls the imaging apparatus 300 to perform imaging when the light projection apparatus 200 projects pattern light.

The image input unit 120 receives an input of a pattern image captured by the imaging apparatus 300. The image input unit 120 outputs the inputted pattern image to the three-dimensional location calculation unit 140 and a storage unit (not shown).

The pattern storage unit 130 stores patterns projected by the light projection apparatus 200. The pattern storage unit 130 outputs a stored pattern to the three-dimensional location calculation unit 140.

The three-dimensional location calculation unit 140 calculates the three-dimensional coordinates of features on the object. Briefly (details will be discussed below), the three-dimensional location calculation unit 140 performs correction of the lens distortion and calculation of the three-dimensional coordinates (X, Y, Z) of the point P1 on the object based on the coordinates of the point P2 (u, v) in the projection plane and the coordinates of the point P3 (m, n) in the imaging plane. It should be noted that the three-dimensional location calculation unit 140 is one example of the calculation unit according to an embodiment.

2-2. Hardware Configuration

Figure 3:
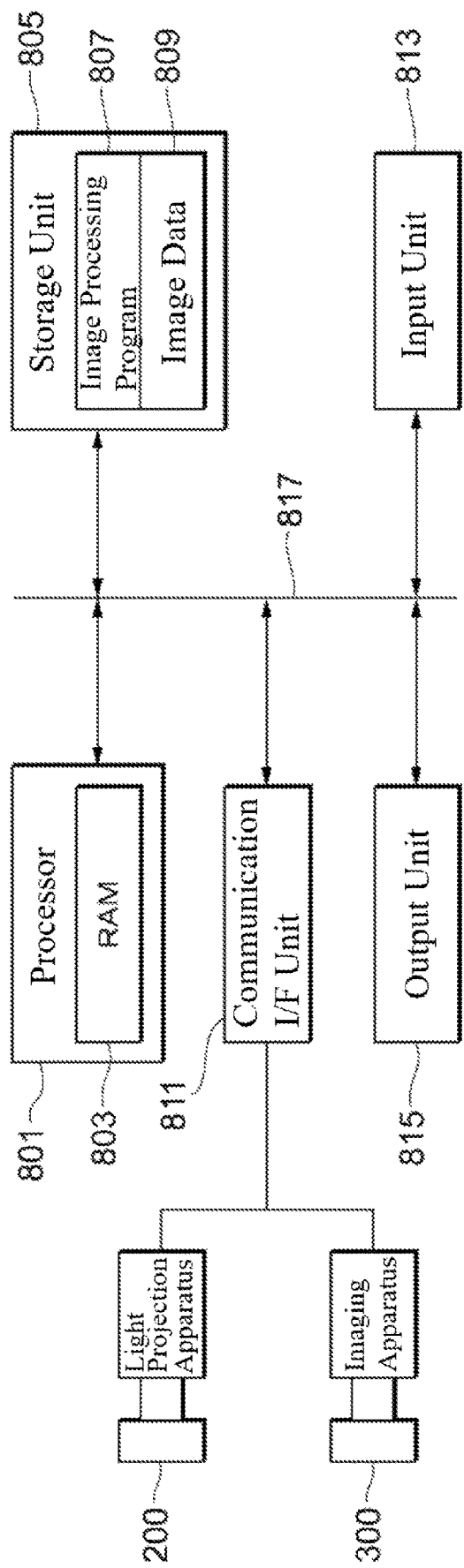
FIG. 3 is a schematic view illustrating one example of the hardware configuration of an image processing system according to an embodiment.

A hardware configuration that can implement the image processing system 1 will be described hereinafter with reference to FIG. 3. FIG. 3 schematically shows one example of the hardware configuration of the image processing system 1 according to an embodiment.

The image processing system 1 illustrated in FIG. 3 includes a processor 801, a storage unit 805, a communication interface (I/F) unit 811, an input unit 813, an output unit 815, and a bus line 817 that communicably connects these elements to one another.

The processor 801 includes a CPU (Central Processing Unit), a RAM (Random Access Memory) 803, and a ROM (Read Only Memory) and controls each of these elements according to the information to be processed. The storage unit 805 is an auxiliary storage, such as a hard disk drive (HDD), a solid-state drive (SSD), etc., that stores the image processing program 807 executed by the processor 801 and the image data 809, etc., such as captured pattern images.

The image processing program 807 causes the image processing system 1 to perform the above-described processing. In particular, the processor 110, the image input unit 120, and the three-dimensional location calculation unit 140 shown in FIG. 2 can be collectively implemented as the image processing program 807.

The communication interface (I/F) unit 811 is, for example, a communication module for communicating with other devices and apparatuses by wired or wirelessly. While the communication I/F unit 811 may communicate with other apparatuses in any suitable system, exemplary systems include a LAN (Local Area Network) and a USB (Universal Serial Bus). In particular, the light projection apparatus 200 and the imaging apparatus 300 may be provided in such a manner as to communicate with the processor 801, etc., via the communication I/F unit 811.

The input unit 813 is a device that can be implemented, for example, by a keyboard, a mouse, a touch panel or the like, to receive various kinds of input operations from the user. The output unit 815 provides the user of the image processing system 1 with various types of information, for example, by means of visuals and sound via a display and a speaker or the like.

3. Example of Operation

The following describes an exemplary operation of the image processing system 1 according to an embodiment.

3-1. Overall Flow of Operation

Figure 4:
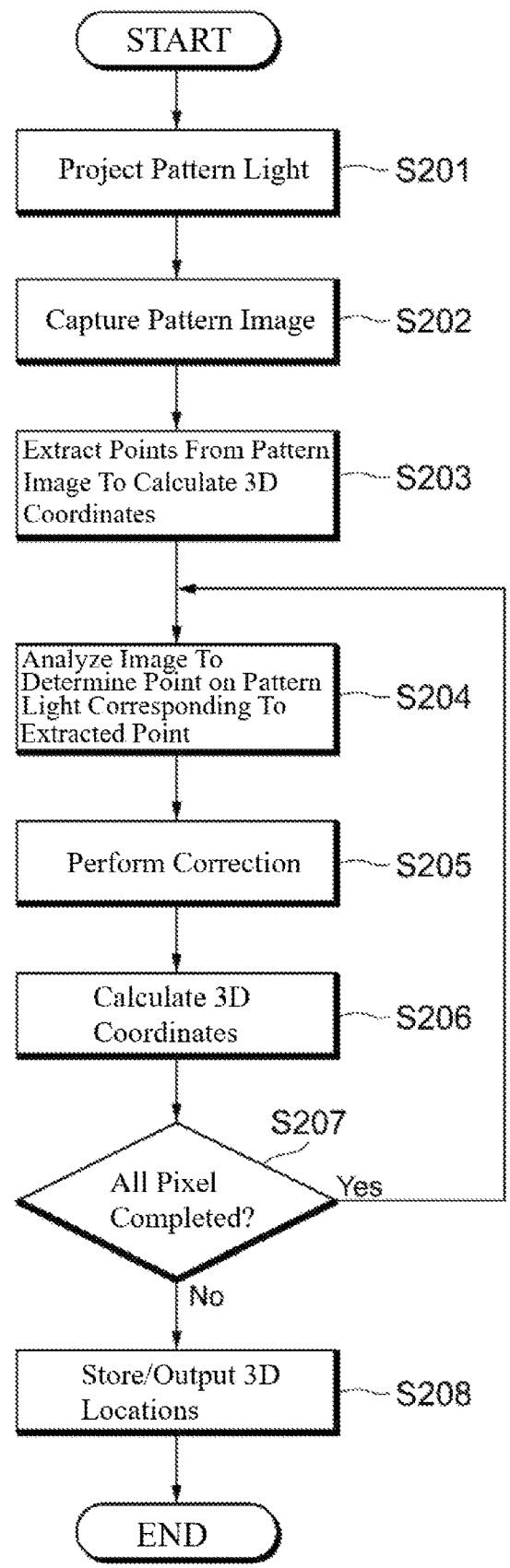
FIG. 4 is a flowchart illustrating the procedure performed by an image processing system according to an embodiment.

FIG. 4 is a flowchart that shows the procedure of the three-dimensional measurement performed by the image processing system 1 according to an embodiment. Each step of the procedure shown in FIG. 4 is typically performed by the processor 801 of the control apparatus 100 executing the image processing program 132.

With reference to FIG. 4, the light projection apparatus 200 projects pattern light to an object under the control of the projection control unit 111 of the control apparatus 100 (S201). Next, the imaging apparatus 300 images the pattern image under the control of the imaging control unit 112 (S202).

The image input unit 120 acquires the pattern image imaged by the imaging apparatus 300 and passes the image to the three-dimensional location calculation unit 140, which in turn extracts one or more points whose three-dimensional coordinates are to be calculated (S203). While the points whose three-dimensional coordinates are to be calculated may be a plurality of features obtained by analyzing the pattern of the pattern image, an embodiment is not so limited; for example, edges of the imaged object may be used as the features.

The three-dimensional location calculation unit 140 then performs the process of Steps S204 to S206 to be described below on each of the one or more extracted points to calculate the three-dimensional coordinates of each point.

First, the three-dimensional location calculation unit 140 determines the location of the point P2' on the pattern light associated with a point P3 of the plurality of extracted points (S204). Specifically, the pattern image is analyzed to determine the column of u' pattern light that corresponds to the pattern imaged at the location of the point P3 (m, n). As an embodiment uses pattern light whose coordinate component in the column direction can be determined, the column u' of pattern light at any point on the pattern image can be determined by analyzing the pattern image. If pattern light that allows for the determination of the coordinate component in a different direction is used, the determination may be made with respect to the coordinate component in that different direction, instead of the coordinate component in the column direction.

Then, the coordinates (u', v') of the point P2' are calculated based on the intersection between the determined column u' and the epipolar line of the point P3. Note that the epipolar line of the point P3 is the line of intersection between the epipolar plane, which passes through the optical center of the light projection apparatus 200, the optical center of the imaging apparatus 300, and the point P3 in the imaging plane, and the projection plane. In this case, as the locations of the light projection apparatus 200 and the optical center of the imaging apparatus 300 are known, the epipolar line in the projection plane can be found based on the coordinates of the point P3 in the imaging plane.

Subsequently, the three-dimensional location calculation unit 140 performs processing to correct the effect of the distortion of the lens of the light projection apparatus 200 (S205). Briefly (the specific process will be discussed below), this correction calculates the coordinates (u, v) of the point P2, the effect of the lens distortion on which is corrected, based on the coordinates (u', v') of the pre-correction point P2'.

Then, the three-dimensional location calculation unit 140 calculates the three-dimensional coordinates (X, Y, Z) of the point P1 on the object based on the coordinates of the point P2 (u, v) calculated by the correction processing and the coordinates of the point P3 (m, n) extracted from the pattern image (S206). This process of three-dimensionally reconstructing a location will also be described in detail below.

The image processing system 1 repeats the process of Steps S204-S206 on all the points extracted in Step S203 (S207) and stores and/or outputs the calculated three-dimensional coordinates of all the points (S208).

3-2. Correction of Lens Distortion

Figure 5:
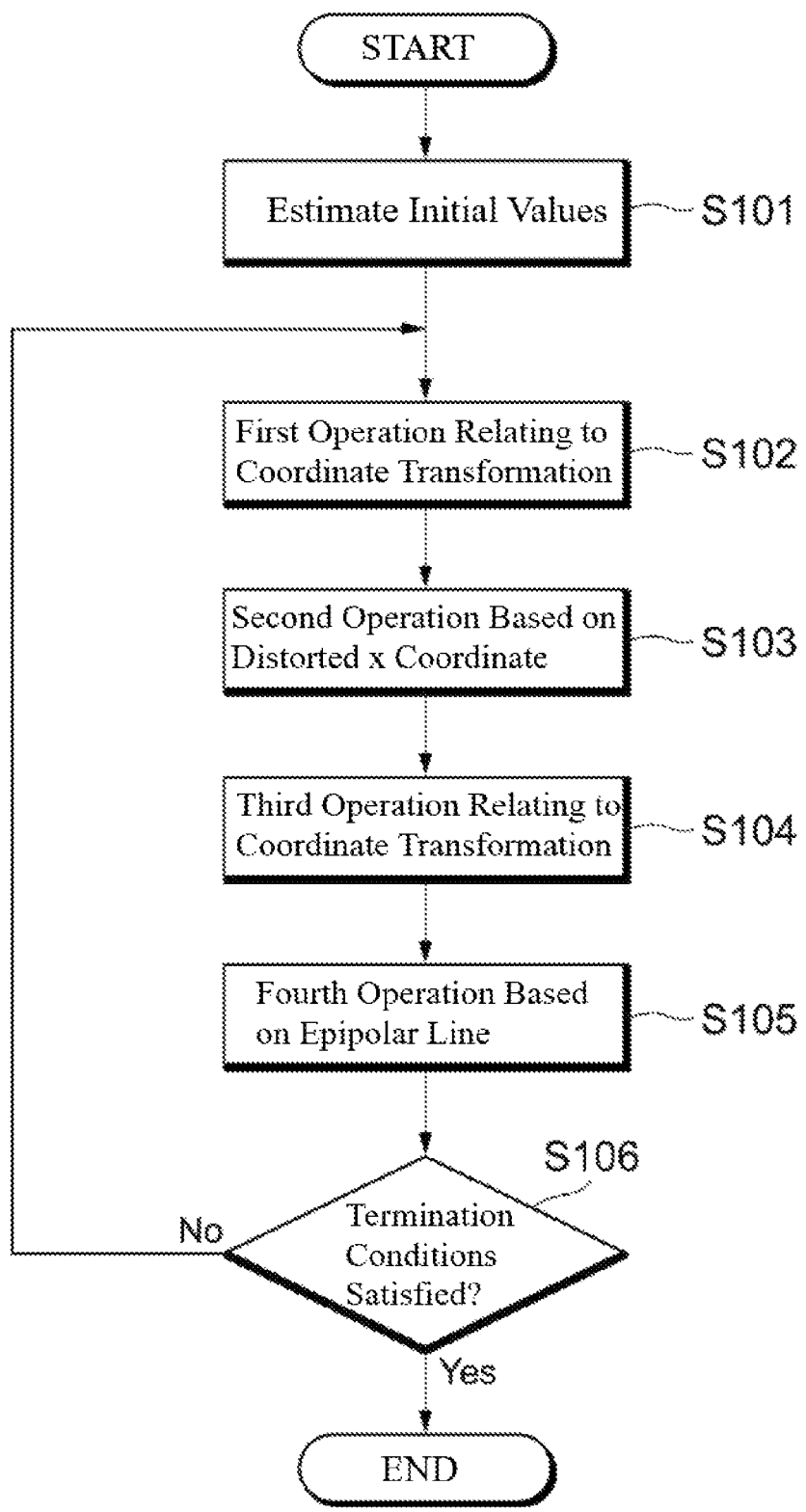
FIG. 5 is a flowchart illustrating the processing performed by a three-dimensional location calculation unit according to an embodiment.

The following describes the correction performed in Step S205 in further detail with reference to FIG. 5 and FIGS. 6A-6F. FIG. 5 is a flowchart of the correction performed by the three-dimensional location calculation unit 140, and FIGS. 6A-6F are views each schematically showing the process of a step of the correction. The broken line X1 in FIGS. 6A-6F is the distorted x coordinate about the point P3, and the solid line E is the epipolar line about the point P3.

Figure 6A:
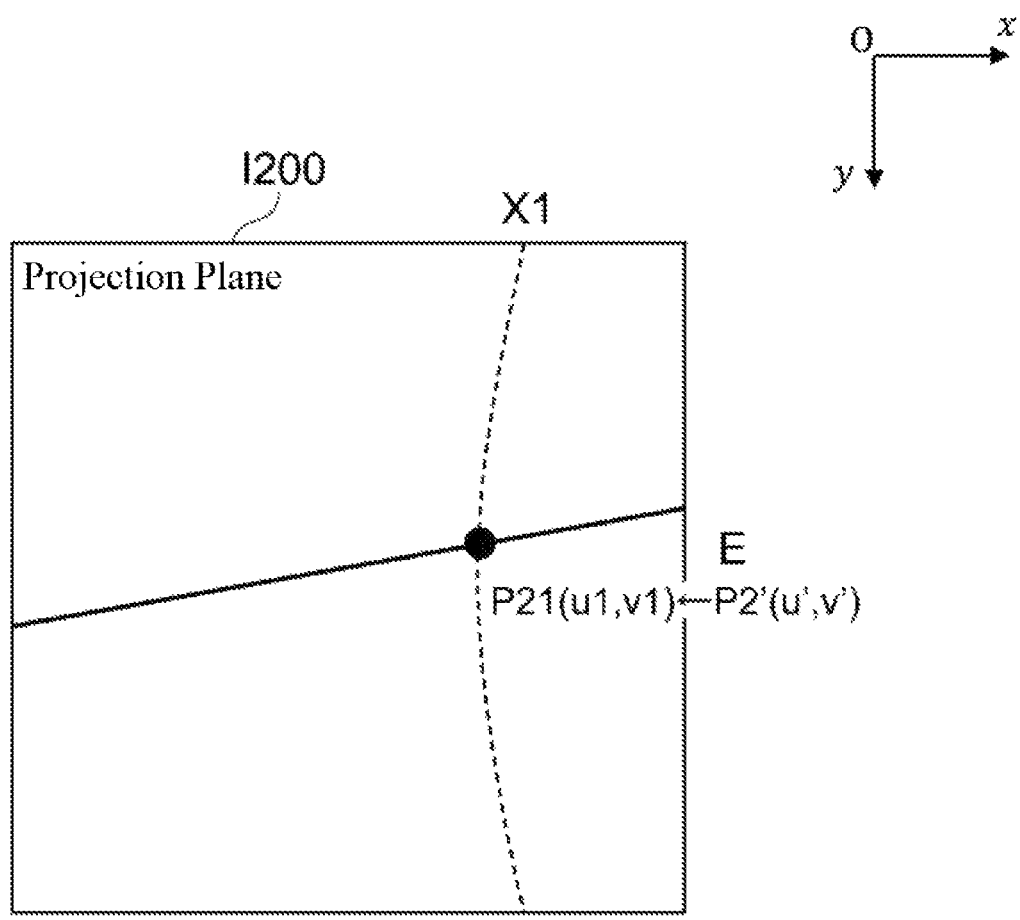
FIG. 6A is a schematic view illustrating the processing performed by a three-dimensional location calculation unit according to an embodiment.

In the correction processing, the three-dimensional location calculation unit 140 first sets the initial values P21 (u1, v1) (S101 of FIG. 5). In this case, the coordinates (u', v') of the point P2' calculated in Step S204 are set as the initial values (FIG. 6A). Then, the first to fourth operations described below are performed.

Figure 6B:
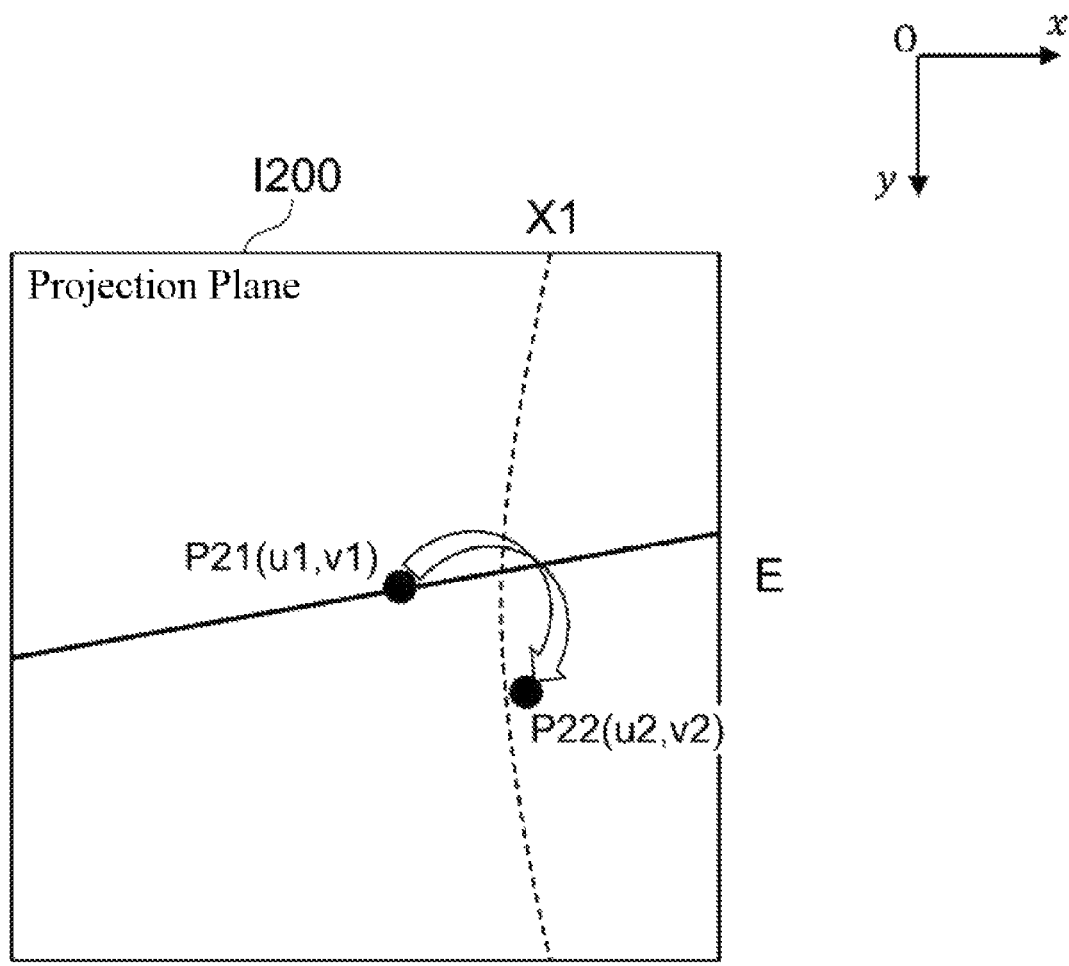
FIG. 6B is a schematic view illustrating the processing performed by a three-dimensional location calculation unit according to an embodiment.

First, the three-dimensional location calculation unit 140 calculates the point P22 (u2, v2) by applying the first operation relating to coordinate transformation to the point P21 (u1, v1) (S102 of FIG. 5). Specifically, the three-dimensional location calculation unit 140 calculates the point P22 (u2, v2) from the point P21 (u1, v1) based on the first operation of the expression (1) below, where $k_1$, $k_2$, $k_3$, $p_1$, and $p_2$ represent the model parameters of the lens distortion, $f_x$ and $f_y$ represent the focal distances of the projector in the x and y directions, respectively, and $c_x$ and $c_y$ represent the coordinates of the principal point of the projector (FIG. 6B). Note that these model parameters can be obtained by calibrating the light projection apparatus 200.

Additionally, as FIG. 6B shows a generalized point P21, this point is shown to be located differently from the location of the point P2' of FIG. 6A.

$$x \leftarrow \frac{u1 - c_x}{f_x}, \quad y \leftarrow \frac{v1 - c_y}{f_y} \quad \text{(Exp. 1)}$$
$$r^2 \leftarrow x^2 + y^2$$
$$d \leftarrow 1 + k_1 r^2 + k_2 r^4 + k_3 r^6$$
$$u2 \leftarrow f_x(dx + p_1 xy + p_2(r^2 + 2x^2)) + c_x$$
$$v2 \leftarrow f_y(dy + p_2 xy + p_1(r^2 + 2y^2)) + c_y$$

Figure 6C:
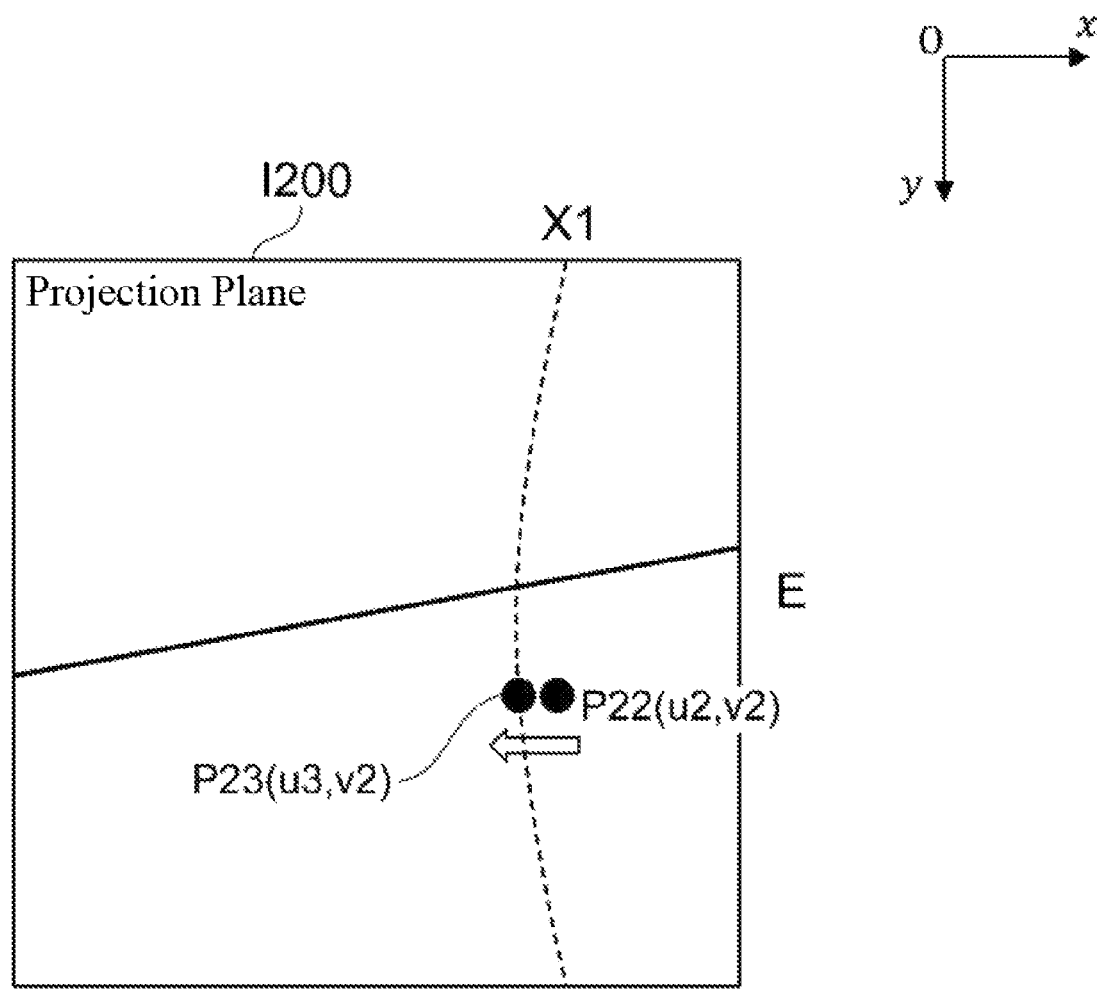
FIG. 6C is a schematic view illustrating the processing performed by a three-dimensional location calculation unit according to an embodiment.

Next, the three-dimensional location calculation unit 140 calculates the point P23 (u3, v3) by applying the second operation based on the distorted x coordinate to the point P22 (u2, v2) (S103 of FIG. 5). In particular, the three-dimensional location calculation unit 140 transfers the point P22 along the x-axis to the point P23 located at X1 on the distorted x-axis (FIG. 6C). At this point, the coordinates (u3, v2) after the transfer become the coordinates of the point P23.

Figure 6D:
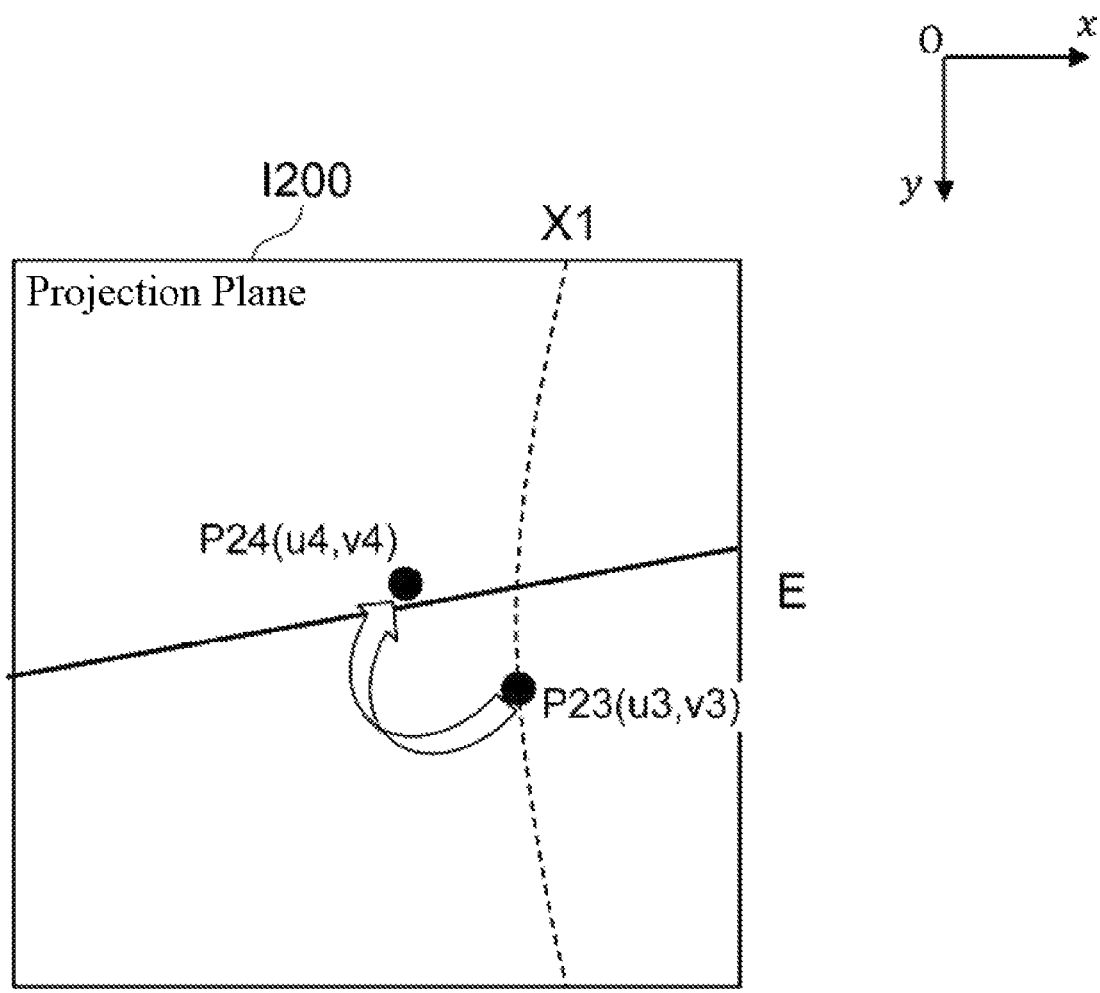
FIG. 6D is a schematic view illustrating the processing performed by a three-dimensional location calculation unit according to an embodiment.

Subsequently, the three-dimensional location calculation unit 140 calculates the point P24 (u4, v4) by applying the third operation relating to coordinate transformation to the point P23 (u3, v3) (S104 of FIG. 5). In particular, the three-dimensional location calculation unit 140 calculates the coordinates of the point P24 (u4, v4) from the point P23 (u3, v3) based on the third operation shown in the expression (2) below (FIG. 6D). The third operation corresponds to the inverse transformation of the first operation, in which the model parameters $f_x$, $f_y$, $c_x$, $c_y$, $k_1$, $k_2$, $k_3$, $p_1$, and $p_2$ are the same as those of the first operation.

$$x' \leftarrow \frac{u3 - c_x}{f_x}, \quad y' \leftarrow \frac{v2 - c_y}{f_y} \quad \text{(Exp. 2)}$$
$$x \leftarrow x', \quad y \leftarrow y'$$
$$\text{Iteration}$$
$$r^2 = x^2 + y^2$$
$$d = 1 + k_1 r^2 + k_2 r^4$$
$$d_x = p_1 xy + p_2(r^2 + 2x^2)$$
$$d_y = p_2 xy + p_1(r^2 + 2y^2)$$
$$x \leftarrow \frac{x' - d_x}{d}$$
$$y \leftarrow \frac{y' - d_y}{d}$$
$$u4 \leftarrow f_x x + c_x, \quad v4 \leftarrow f_y y + c_y$$

Figure 6E:
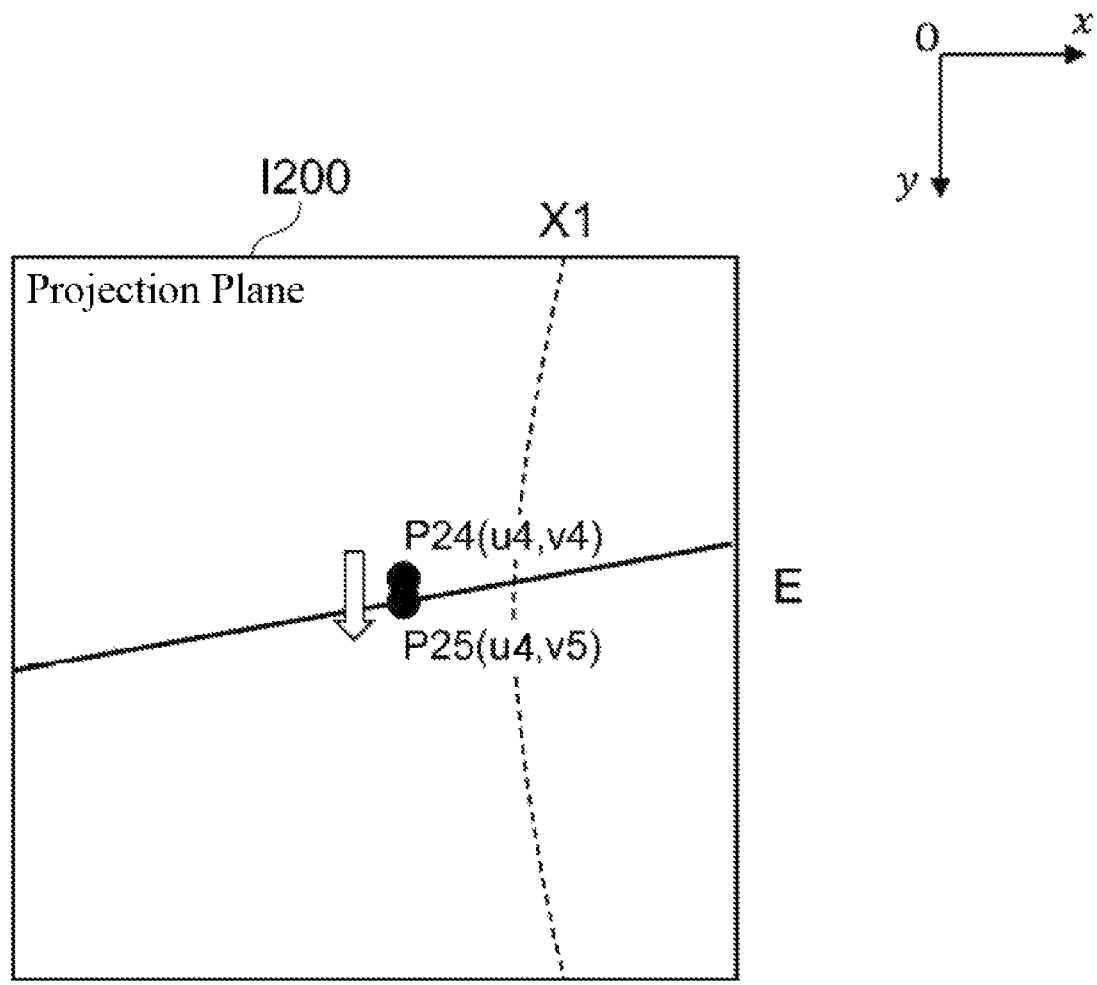
FIG. 6E is a schematic view illustrating the processing performed by a three-dimensional location calculation unit according to an embodiment.

Then, the three-dimensional location calculation unit 140 calculates the point P25 (u5, v5) by applying the fourth operation based on the epipolar line to the point P24 (u4, v4) (S105 of FIG. 5). In particular, the three-dimensional location calculation unit 140 transfers the point P24 along the y-axis to the point P25 located on the epipolar line E (FIG. 6E). At this moment, the coordinates (u4, v5) after the transfer become the coordinates of the point P25. In particular, y found by substituting x=u4 in the epipolar constraint equation represented by ax+by+c=0 may be used as the value of v5.

Figure 6F:
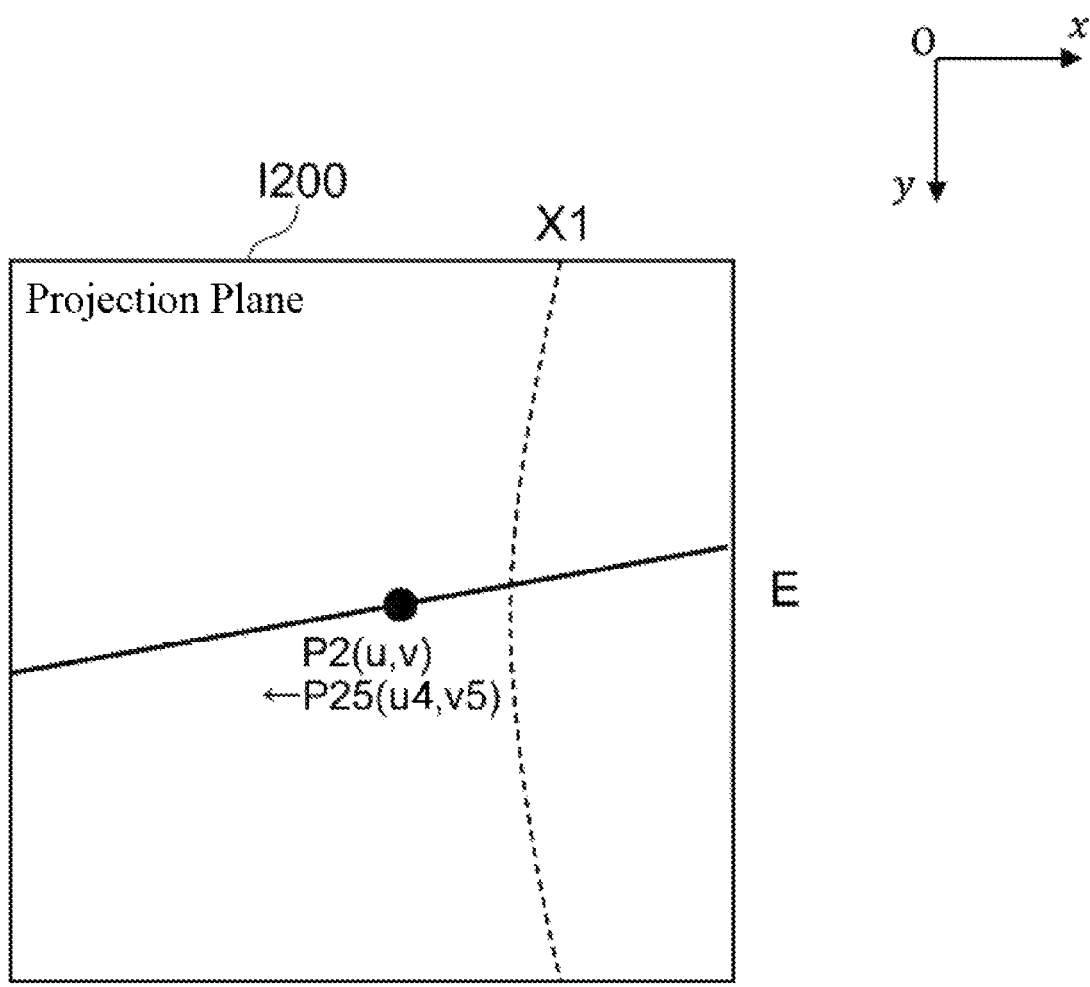
FIG. 6F is a schematic view illustrating the processing performed by a three-dimensional location calculation unit according to an embodiment.

The three-dimensional location calculation unit 140 then performs the sequence of the first to fourth operations (S102 to S105) until a predetermined termination condition is satisfied (S106). The predetermined termination condition may be, for example, that the absolute value of the difference in the estimated coordinates between the previous loop and the current loop is within an allowable parallax error or that a fixed number of loops (for example, five times) have been performed, etc. However, the termination condition is not limited to these. The three-dimensional location calculation unit 140 acquires the coordinates of the point P25 when the termination condition is satisfied as the coordinates of the point P2 (FIG. 6F).

3-3.3 Calculation of Three-Dimensional Coordinates

Figure 7:
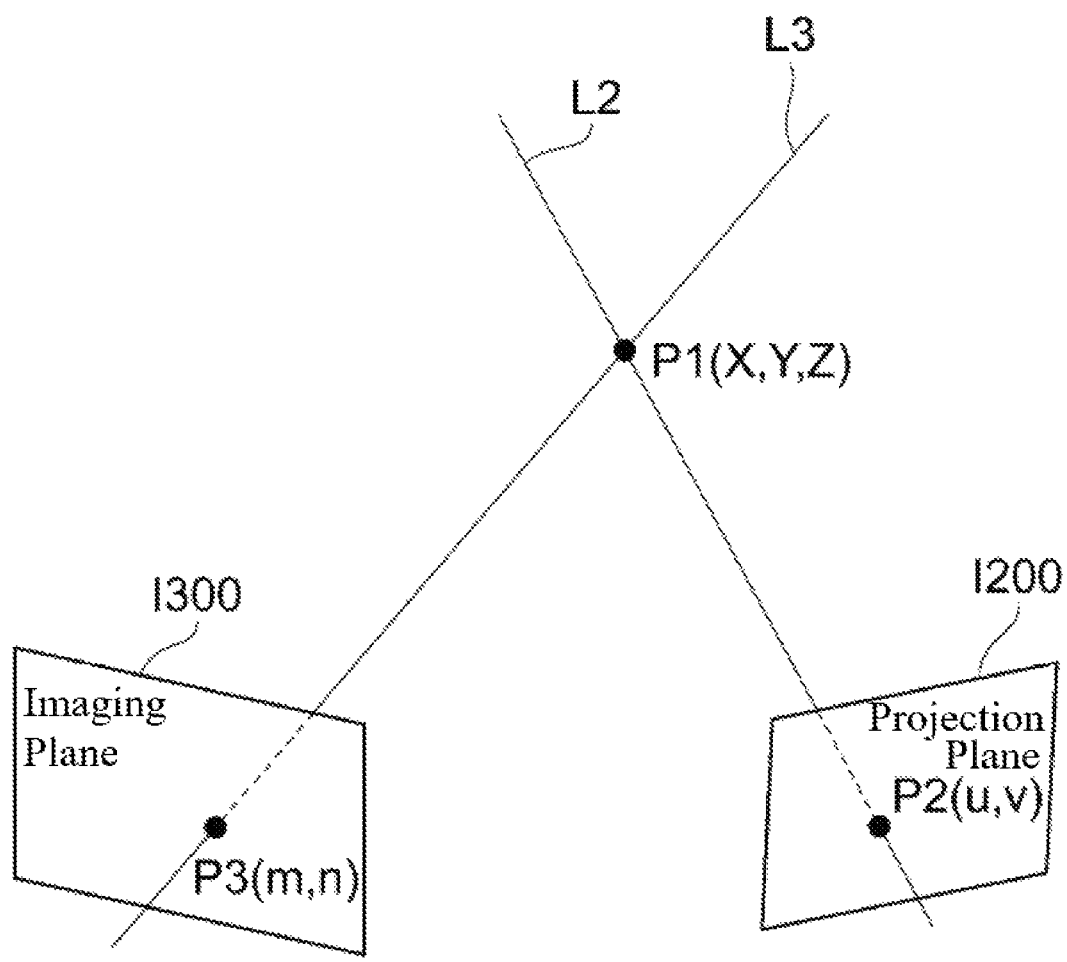
FIG. 7 is a schematic view illustrating the processing performed by a three-dimensional location calculation unit according to an embodiment.

Next, the calculation of the three-dimensional coordinates in Step S206 will be described in further detail with reference to FIG. 7. As shown in FIG. 7, the coordinates of the point P2 in the projection plane are denoted by (u, v), the coordinates of the point P3 in the imaging plane are denoted by (m, n), and the three-dimensional coordinates of the point P1 on the object are denoted by (X, Y, Z). Additionally, the straight line connecting the point P2 and the optical center of the light projection apparatus 200 is denoted as L2 and the straight line connecting the point P3 and the optical center of the imaging apparatus 300 is denoted as L3. Then, if the point P1 corresponds to the intersection between the straight lines L2 and L3, the three-dimensional coordinates (X, Y, Z) of the point P1 can be calculated by finding X, Y, Z that satisfy the expressions (3) and (4) below. In the expressions (3) and (4) below, $P_{cam}$ is a 3×4 matrix obtained by calibration, and $P_{prij}$ is a 3×4 matrix obtained by calibration.

$$\begin{pmatrix} m \\ n \\ 1 \end{pmatrix} = P_{cam} \begin{pmatrix} X \\ Y \\ Z \\ 1 \end{pmatrix} \quad \text{(Exp. 3)}$$

$$\begin{pmatrix} u \\ v \\ 1 \end{pmatrix} = P_{prij} \begin{pmatrix} X \\ Y \\ Z \\ 1 \end{pmatrix} \quad \text{(Exp. 4)}$$

It should be noted that there may be cases where the straight lines L2 and L3 do not intersect each other due to the effect of noise. In such cases, for example, a least-squares method may be performed to treat the closest point to the straight lines L2 and L3 as estimated values of the three-dimensional coordinates of the point P1 on the object.

The image processing system 1 according to an embodiment corrects the effect of the lens distortion of the light projection apparatus 200 to calculate three-dimensional coordinates. Three-dimensional locations of an object can be estimated with higher precision by correcting the effect of the lens distortion.

APPENDICES

Having thus described embodiments in detail, the foregoing description merely illustrates the present invention in all aspects. It goes without saying that various modifications and changes may be made without departing from the scope of the present invention. Part or entirety of the foregoing embodiment may be described as the appendices set forth blow without being limited thereto.

Appendix 1

An image processing system (1) comprising:

a light projection apparatus (200) for projecting pattern light whose coordinate component at least in one direction is determinable;

an imaging apparatus (300) for imaging an object to which the pattern light is projected to acquire a pattern image; and a control apparatus (100) including a calculation unit configured to calculate the three-dimensional coordinates of at least one point (P1) on the object based on the pattern light and the pattern image;

wherein the calculation unit (140) includes:

a determination unit configured to determine a first point (P3) on the pattern image;

a calculation unit configured to calculate a second point (P2') in a projection plane of the pattern light based on a pattern imaged on the location of the first point (P3), the second point (P2') corresponding to the first point (P3);

a correction unit configured to calculate a third point (P2) based on the second point (P2') in the projection plane, a nonlinear line (X1) in the projection plane calculated by analyzing the pattern image, and an epipolar line (E) in the projection plane calculated based on the first point (P3); and a calculation unit configured to calculate the three-dimensional coordinates of the point (P1) on the object based on the first point (P3) and the third point (P2).

Appendix 2

The image processing system (1) according to Appendix 1, wherein the correction unit includes:

a setting unit configured to set the second point (P2') as an initial value point A (P21);

a calculation unit configured to calculate a point B (P22) by performing a first operation relating to coordinate transformation on the point A (P21);

a calculation unit configured to calculate a point C (P23) by performing a second operation based on the nonlinear line (X1) on the point B (P22);

a calculation unit configured to calculate a point D (P24) by performing a third operation relating to coordinate transformation on the point C (P23); and a calculation unit configured to calculate a point E (P25) by performing a fourth operation based on the epipolar line (E) on the point D (P24).

Appendix 3

The image processing system (1) according to Appendix 2, wherein the correction unit further includes a determination unit configured to determine whether or not a predetermined termination condition is satisfied after the fourth operation is executed, and wherein, if it is determined that the termination condition is satisfied, the determination unit sets the point E (P25) as the third point (P2) and, if it is determined that the termination condition is not satisfied, sets the point E (P25) as the initial value point A (P21) and repeats the first to fourth operations.

Appendix 4

The image processing system (1) according to Appendix 3, wherein the termination condition is that the coordinates of the point A (P21) and the point E (P25) are within a predetermined range.

Appendix 5

The image processing system (1) according to Appendix 3, wherein the termination condition is the number of times the first to fourth operations have been repeated.

Appendix 6

The image processing system (1) according to any one of Appendices 1-5, wherein the nonlinear line (X1) is calculated by analyzing a straight line whose coordinate component in one direction on the pattern image is the same as the first point.

Appendix 7

A control apparatus (100) connected to a light projection apparatus (200) for projecting pattern light whose coordinate component at least in one direction is determinable and an imaging apparatus (300) for imaging an object to which the pattern light is projected to acquire a pattern image, the control apparatus (100) comprising a calculation unit (140) configured to calculate the three-dimensional coordinates of at least one point (P1) on the object based on the pattern light and the pattern image;

wherein the calculation unit (140) is configured to:

determine a first point (P3) on the pattern image;

calculate a second point (P2') in a projection plane of the pattern light based on a pattern imaged on the location of the first point (P3), the second point (P2') corresponding to the first point (P3);

calculate a third point (P2) based on the second point (P2') in the projection plane, a nonlinear line (X1) in the projection plane calculated by analyzing the pattern image, and an epipolar line (E) in the projection plane calculated based on the first point (P3); and calculate the three-dimensional coordinates of the point (P1) on the object based on the first point (P3) and the third point (P2).

Appendix 8

A method performed by a control apparatus (100) connected to a light projection apparatus (200) for projecting pattern light whose coordinate component at least in one direction is determinable and an imaging apparatus (300) for imaging an object to which the pattern light is projected to acquire a pattern image, the method calculating the three-dimensional coordinates of at least one point (P1) on the object based on the pattern light and the pattern image and comprising the steps of:

determining a first point (P3) on the pattern image;

calculating a second point (P2') in a projection plane of the pattern light based on a pattern imaged on the location of the first point (P3), the second point (P2') corresponding to the first point (P3);

calculating a third point (P2) based on the second point (P2') in the projection plane, a nonlinear line (X1) in the projection plane calculated by analyzing a straight line whose coordinate component in the one direction on the pattern image is the same as the first point, and an epipolar line (E) in the projection plane calculated based on the first point (P3); and calculating the three-dimensional coordinates of the point (P1) on the object based on the first point (P3) and the third point (P2).

Appendix 9

A program for use in a control apparatus (100) connected to a light projection apparatus (200) for projecting pattern light whose coordinate component at least in one direction is determinable and an imaging apparatus (300) for imaging an object to which the pattern light is projected to acquire a pattern image, the program causing the control apparatus (100) to calculate the three-dimensional coordinates of at least one point (P1) on the object based on the pattern light and the pattern image and further causing:

the control apparatus (100) to function as:

a determination unit configured to determine a first point (P3) on the pattern image;

a calculation unit configured to calculate a second point (P2') in a projection plane of the pattern light based on a pattern imaged on the location of the first point (P3), the second point (P2') corresponding to the first point (P3);

a calculation unit configured to calculate a third point (P2) based on the second point (P2') in the projection plane, a nonlinear line (X1) in the projection plane calculated by analyzing the pattern image, and an epipolar line (E) in the projection plane calculated based on the first point (P3); and a calculation unit configured to calculate the three-dimensional coordinates of the point (P1) on the object based on the first point (P3) and the third point (P2).

The invention claimed is:

1. An image processing system comprising:
a light projector projecting pattern light having a coordinate component in at least one direction that is determinable;
a camera imaging an object upon which the pattern light is projected to acquire a pattern image; and
a control apparatus comprising a processor configured with a program for calculating three-dimensional coordinates of at least one point on the object based on the pattern light and the pattern image;
wherein the processor is configured with the program to perform operations comprising:
determining a first point on the pattern image;
calculating a second point in a projection plane of the pattern light based on a location of the first point on the pattern image, the second point corresponding to the first point;
calculating a third point based on the second point in the projection plane, a nonlinear line in the projection plane calculated by analyzing the pattern image, and an epipolar line in the projection plane calculated based on the first point; and
calculating the three-dimensional coordinates of the point on the object based on the first point and the third point.

2. The image processing system according to claim 1, wherein the processor is configured with the program to perform operations further comprising:

setting the second point as an initial value point A;
calculating a point B by performing a first operation relating to a coordinate transformation on the point A;
calculating a point C by performing a second operation based on the nonlinear line on the point B;
calculating a point D by performing a third operation relating to a coordinate transformation on the point C; and
calculating a point E by performing a fourth operation based on the epipolar line on the point D.

3. The image processing system according to claim 2, wherein the processor is configured with the program to perform operations further comprising:
determining whether a predetermined termination condition is satisfied after the fourth operation is executed;
in response to determining that the termination condition is satisfied, setting the point E as the third point; and
in response to determining that the termination condition is not satisfied, setting the point E as the initial value point A and repeating the first operation, the second operation, the third operation and the fourth operation.

4. The image processing system according to claim 3, wherein the termination condition comprises coordinates of the point A and the point E being within a predetermined range.

5. The image processing system according to claim 3, wherein the termination condition comprises a number of times the first to fourth operations have been repeated.

6. The image processing system according to claim 1, wherein the processor is configured with the program to perform operations comprising calculating the nonlinear line by analyzing a straight line having a coordinate component in one direction on the pattern image that is the same as that of the first point.

7. The image processing system according to claim 2, wherein the processor is configured with the program to perform operations further comprising calculating the nonlinear line by analyzing a straight line having a coordinate component in one direction on the pattern image that is the same as that of the first point.

8. The image processing system according to claim 3, wherein the processor is configured with the program to perform operations comprising calculating the nonlinear line by analyzing a straight line having a coordinate component in one direction on the pattern image that is the same as that of the first point.

9. The image processing system according to claim 4, wherein the processor is configured with the program to perform operations comprising calculating the nonlinear line by analyzing a straight line having a coordinate component in one direction on the pattern image that is the same as that of the first point.

10. The image processing system according to claim 5, wherein the processor is configured with the program to perform operations comprising calculating the nonlinear line by analyzing a straight line having a coordinate component in one direction on the pattern image that is the same as that of the first point.

11. A control apparatus connected to a light projector for projecting pattern light having a coordinate component in at least one direction that is determinable and a camera imaging an object upon which the pattern light is projected to acquire a pattern image, the control apparatus comprising a processor configured with a program for calculating three-dimensional coordinates of at least one point on the object based on the pattern light and the pattern image;
wherein the processor is configured with the program to perform operations comprising:
operation as a determination unit configured to determine a first point on the pattern image;
operation as a calculation unit configured to calculate a second point in a projection plane of the pattern light based on a location of the first point on the pattern image, the second point corresponding to the first point;
operation as a correction unit configured to calculate a third point based on the second point in the projection plane, a nonlinear line in the projection plane calculated by analyzing the pattern image, and an epipolar line in the projection plane calculated based on the first point; and
operation as a calculation unit configured to calculate the three-dimensional coordinates of the point on the object based on the first point and the third point.

12. A method performed by a control apparatus connected to a light projection apparatus for projecting pattern light having a coordinate component in at least one direction that is determinable and an imaging apparatus for imaging an object upon which the pattern light is projected to acquire a pattern image, the method calculating three-dimensional coordinates of at least one point on the object based on the pattern light and the pattern image, the method comprising:
determining a first point on the pattern image;
calculating a second point in a projection plane of the pattern light based on a location of the first point in the pattern image, the second point corresponding to the first point;
calculating a third point based on the second point in the projection plane, a nonlinear line in the projection plane calculated by analyzing the pattern image, and an epipolar line in the projection plane calculated based on the first point; and
calculating the three-dimensional coordinates of the point on the object based on the first point and the third point.

13. A non-transitory computer-readable recording medium storing a program for use in a control apparatus comprising a processor connected to a light projection apparatus for projecting pattern light having a coordinate component in at least one direction that is determinable and an imaging apparatus for imaging an object to which the pattern light is projected to acquire a pattern image, the program, when read and executed, causing the processor to perform operations comprising:
determining a first point on the pattern image;
calculating a second point in a projection plane of the pattern light based on a pattern imaged on a location of the first point, the second point corresponding to the first point;
calculating a third point based on the second point in the projection plane, a nonlinear line in the projection plane calculated by analyzing the pattern image, and an epipolar line in the projection plane calculated based on the first point; and
calculating three-dimensional coordinates of the point on the object based on the first point and the third point.

14. The method according to claim 12, wherein calculating the third point further comprises:
setting the second point as an initial value point A;
calculating a point B by performing a first operation relating to a coordinate transformation on the point A;
calculating a point C by performing a second operation based on the nonlinear line on the point B;

calculating a point D by performing a third operation relating to a coordinate transformation on the point C; and calculating a point E by performing a fourth operation based on the epipolar line on the point D.

15. The method according to claim 14, further comprising:

determining whether a predetermined termination condition is satisfied after the fourth operation is executed;

in response to determining that the termination condition is satisfied, setting the point E as the third point; and in response to determining that the termination condition is not satisfied, setting the point E as the initial value point A and repeating the first operation, the second operation, the third operation, and the fourth operation.

16. The method according to claim 15, wherein the termination condition comprises coordinates of the point A and the point E being within a predetermined range.

17. The method according to claim 15, wherein the termination condition comprises a number of times the first to fourth operations have been repeated.

18. The method according to claim 12, further comprising calculating the nonlinear line by analyzing a straight line having a coordinate component in one direction on the pattern image that is the same as that of the first point.

* * * * *